(12) United States Patent
Shih et al.

(10) Patent No.: US 6,331,322 B1
(45) Date of Patent: Dec. 18, 2001

(54) METHOD FOR PROCESSING MARINE PRODUCTS

(75) Inventors: Chih-Hsing Shih, Tung-Kang; Tien-Pao Chiu, Ping-Tung, both of (TW)

(73) Assignee: PT Intisamudera Citra Perkasa, Pelabuhan Benda Denpasar Bali (ID)

( * ) Notice: Subject to any disclaimer, the term of this patent is extended or adjusted under 35 U.S.C. 154(b) by 0 days.

(21) Appl. No.: 09/630,096

(22) Filed: Aug. 1, 2000

(51) Int. Cl.⁷ .................................................. A23L 1/325
(52) U.S. Cl. ........................ 426/315; 426/264; 426/643; 426/314
(58) Field of Search .................... 426/643, 418, 426/264, 312, 314, 315, 486

(56) References Cited

U.S. PATENT DOCUMENTS

| | | | |
|---|---|---|---|
| 2,303,740 * | 12/1942 | Hempel | 426/264 |
| 4,001,446 * | 1/1977 | Hood | 426/264 |
| 4,089,983 * | 5/1978 | Hood | 426/264 |
| 4,102,653 * | 7/1978 | Simmons | 44/16 R |
| 4,522,835 * | 6/1985 | Woodruff | 426/264 |
| 5,484,619 * | 1/1996 | Yamaoka | 426/315 |
| 5,972,401 * | 10/1999 | Kowalski | 426/314 |
| 6,042,859 * | 3/2000 | Shaklai | 426/264 |

* cited by examiner

*Primary Examiner*—Carolyn Paden
(74) *Attorney, Agent, or Firm*—Jiawei Huang; J. C. Patents

(57) ABSTRACT

A method for processing marine products includes a plurality of steps. First put natural charcoal in a vacuum oven and draw air out of the vacuum oven. Second, heat up the interior of the vacuum oven to let charcoal produce carbon monoxide and water vapor, and third, cool carbon monoxide in a cooling tank to room temperature. Fourth. separate carbon monoxide from water vapor and draw carbon monoxide into an air bag. Fifth, draw the carbon monoxide in a marine food processing device to let carbon monoxide function to settle iron contained in marine food to remain in the meat of marine food to keep fresh red color and freshness of marine food.

1 Claim, 1 Drawing Sheet

METHOD FOR PROCESSING MARINE PRODUCTS

BACKGROUND OF THE INVENTION

This invention relates to a method for processing, marine products. particularly to one utilizing natural charcoal to produce carbon monoxide CO in stifled high temperature for processing marine products. The method uses a vacuum oven with charcoal placed therein, pumping out the air in the container to the vacuum condition, making the charcoal in a slowly stifled burning condition at the temperature of 180° C. or so, letting charcoal give out carbon monoxide and water vapor, cooling it down to a room temperature, and then sending it in a separating device, wherein carbon monoxide is separated from water vapor. Then water vapor may gradually concentrate to water drops to be removed. Then carbon monoxide is drawn in an air bag with a pump and then drawn it in a marine food processing device to let carbon monoxide function to settle iron contained in the meat of marine food and remain therein so as to keep fresh red color and freshness of marine food.

Conventional methods for processing marine products may cause meat nutrition and iron lost not a little during the process, completed marine products may not only have reduced nutrition, but much iron in the products lost during the process, with the meat of the product look whitish to diminish its good appearance, and with nutritional the product should have somewhat lost. So some processors may add additive to products to let meat look a little red. Though additive does not harm health of consumers, it will be accumulated to become some burden to the body owing to being not solvable.

SUMMARY OF THE INVENTION

This invention is to offer a method for processing marine products, by which processed products may have freshness they should have, not losing its nutrition as food.

The invention has the following features.

1. It uses natural charcoal burning in a stifled condition in a vacuum oven to produce carbon monoxide CO.

2. Carbon monoxide produced is cooled down in a cooling tank to room temperature, and then separated from water vapor by means of a separating device.

3. Then carbon monoxide is drawn out with a pump into an air bag, and then it is drawn out of the bag by means of a compressor, into a marine food processing device, making use of function of carbon monoxide to settle iron contained in marine foods so as to keep their freshness.

BRIEF DESCRIPTION OF DRAWINGS

This invention will be better understood by referring to the accompanying drawing, wherein: The FIGURE is a flowing chart of a method for processing marine products.

DETAILED DESCRIPTION OF THE PREFERRED EMBODIMENT

Figure 1:
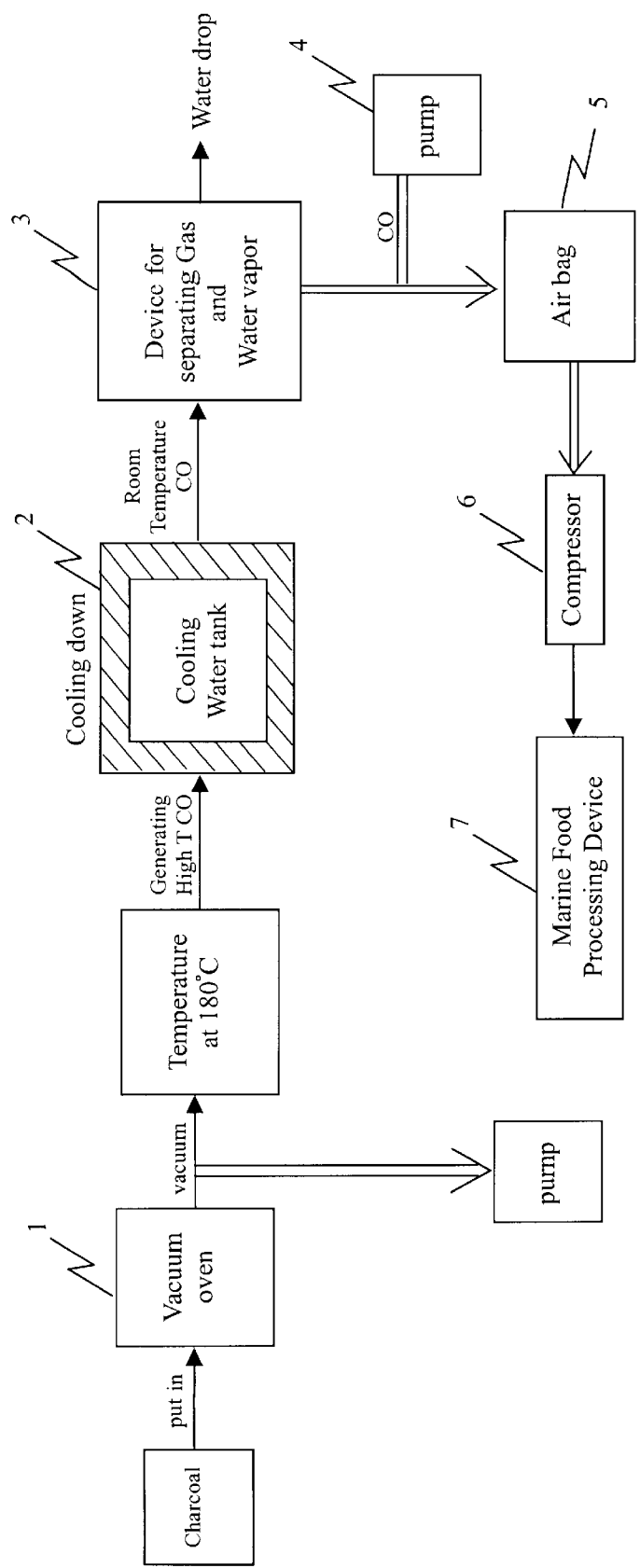

A preferred embodiment of a method for processing marine products, as shown in FIG. 1, a flow chart, includes a plurality of steps. A first step is putting charcoal in a vacuum oven 1 and to pump out air therein with a vacuum pump 10 in the vacuum condition, and a second step is to heat up the interior of the vacuum oven to the temperature 180° C. or so, for example in the range of 1 to 190° C. to let charcoal produce carbon monoxide CO and water vapor in a stifled burning condition so as to reduce smoke to avoid polluting the environment as one point, and to prevent outer air from entering the vacuum oven to reduce water vapor volume in a second point, and to collect the carbon monoxide given out of the stiflingly burning charcoal in a third point. Then a third step i, sending carbon monoxide CO in a cooling tank 2 to cool its temperature to room temperature or nearly to room temperature. A forth step is to send carbon monoxide of room temperature in a separating device 3 wherein the gas (CO) is separated from water vapor which will gradually concentrate into water drops to be removed. A fifth step is to draw carbon monoxide in an air bag with a pump 4 and then draw carbon monoxide therein into a marine food processing device 7, wherein carbon monoxide functions to settle iron contained in marine food so as to remain in the meat of marine food, and thus nutritional ingredient of 4marine food may no, disappear in the first place, and iron in marine food may keep the meat fresh red in the second place. In addition, the freshness of marine products results from using natural material, never involving harmful effect to the environment and human bodies. This is a large breakthrough in marine product processing, having extremely high worthiness in marine industry.

What is claimed is:

1. A method for processing marine products comprising:
    a first step of putting natural charcoal in a vacuum oven and of drawing out the air in said vacuum oven with a vacuum pump to make said vacuum oven in a vacuum condition;
    a second step of heating up an interior of said vacuum oven to the temperature 180° C. or so to let said charcoal produce carbon monoxide and water vapor;
    a third step of sending said carbon monoxide of high temperature in a cooling tank to cool said carbon monoxide to room temperature or nearly room temperature;
    a fourth step of separating said carbon monoxide from water vapor with a separating device to let water vapor gradually concentrate to water drops to be removed;
    a fifth step of drawing said carbon monoxide in all air bag;
    a sixth step of drawing said carbon monoxide from said air bag with a compressor in a marine food processing device, wherein said carton monoxide functions to settle iron contained in said marine food to remain in the meat of said marine food to keep fresh red color and freshness of said marine food.

* * * * *